United States Patent [19]
Morgan

[11] 4,336,687
[45] Jun. 29, 1982

[54] LOAD SENSING CONTROLLER

[75] Inventor: David F. Morgan, Minnetonka, Minn.

[73] Assignee: Eaton Corporation, Cleveland, Ohio

[21] Appl. No.: 142,526

[22] Filed: Apr. 21, 1980

[51] Int. Cl.³ .............................................. B62D 5/08
[52] U.S. Cl. ...................................... 60/384; 60/422; 60/452
[58] Field of Search ................. 180/132; 60/384, 420, 60/450, 484; 91/422, 452; 137/596.13

[56] References Cited

U.S. PATENT DOCUMENTS

| | | | |
|---|---|---|---|
| Re. 25,126 | 2/1962 | Charlson | 91/467 |
| 3,455,210 | 7/1969 | Allen | 91/446 |
| 3,566,749 | 3/1971 | Allen et al. | 91/445 |
| 3,584,985 | 6/1971 | Baatrup | 180/146 X |
| 3,602,104 | 8/1971 | Stremple | 91/446 |
| 3,819,307 | 6/1974 | Uppal | 418/61 B |
| 3,915,253 | 10/1975 | Ott et al. | 60/384 X |
| 3,979,908 | 9/1976 | Alderson | 60/422 |
| 4,037,620 | 7/1977 | Johnson | 60/384 X |
| 4,043,419 | 8/1977 | Larson et al. | 180/132 |
| 4,096,883 | 6/1978 | Yip | 91/467 X |

FOREIGN PATENT DOCUMENTS

2004513 4/1979 Fed. Rep. of Germany ...... 180/132

*Primary Examiner*—A. Michael Chambers
*Attorney, Agent, or Firm*—C. H. Grace; L. J. Kasper

[57] ABSTRACT

A load sensing controller is disclosed of the type which may be used in a hydrostatic power steering system. The controller housing includes a valving arrangement (29) and a fluid meter (31), through which fluid is delivered to a steering cylinder (15). A controller housing (63) defines a load signal port (25) which is connected to a load sensing flow control valve (39) to vary the rate of fluid delivery to the controller. During normal operation, a steering load signal is sensed downstream of a variable flow control orifice (131) and communicated through a shuttle valve assembly (151) to the load signal port (25). When the steering cylinder is subjected to an overrunning load, an increased load signal is sensed upstream of a variable orifice (136) and the shuttle valve assembly communicates this increased load signal to the load signal port to increase the rate of fluid delivery to the controller to prevent cavitation. The resulting increased rate of flow through the fluid meter increases follow-up movement to the valving, thus reducing the flow area of the variable orifice (136) to restrict the discharge flow rate, which also aids in preventing cavitation.

13 Claims, 7 Drawing Figures

LOAD SENSING CONTROLLER

BACKGROUND OF THE DISCLOSURE

The present invention relates to load sensing flow control systems, and in particular, to such flow control systems including load sensing controllers having fluid actuated mechanisms for imparting follow-up movement to the controller valve means. Furthermore, the present invention relates to load sensing flow control systems in which the load sensing circuit itself is utilized to overcome problems associated with overrunning loads and cavitation.

Although the present invention relates to many types of load sensing flow control systems, the problems associated with overruning loads and cavitation are especially noticeable in load sensing hydrostatic power steering systems. Therefore, the present invention will be described in connection with such a load sensing steering system, and more particularly, in connection with a load sensing controller of the general type illustrated and described in U.S. Pat. No. 4,096,883, assigned to the assignee of the present invention.

Cavitation in hydrostatic power steering systems is frequently caused by the system being subjected to an overrunning load. This is generally understood by those skilled in the art and will be described only briefly. The term "overrunning load" as used herein typically refers to a situation in which an external force is applied to the steered wheels, and thus, also to the steering cylinder. When this occurs, the rate of cylinder travel may exceed the steering wheel rate, such that fluid is discharged from the cylinder, back to the system reservoir, at a rate faster than fluid is supplied to the cylinder, through the controller. The typical result will be that in the delivery side of the circuit, the fluid pressure drops below atmospheric pressure, causing the formation of a gas pocket. In controllers of the type to which the present invention relates, the gas pocket may be transferred from wherever it first occurs to the fluid actuated follow-up mechanism (fluid meter).

In conventional controllers for hydrostatic steering systems there have been two primary approaches to the problem of cavitation, summarized briefly as follows:

1. The use of anti-cavitation check valves to permit fluid to enter the delivery side of the circuit (when it drops below atmospheric pressure) from a source such as the return line;
2. Modification the controller valving to restrict the rate of fluid discharge from the cylinder, through the controller.

Each of these approaches has been somewhat satisfactory, and can also be used upon load sensing controllers. However, neither of these approaches can guarantee keeping the flow rate through the delivery side of the circuit the same as the discharge flow rate. In other words, each of the prior art approaches does help, but neither is a "positive" solution to the problem, i.e., neither one inherently provides a known relationship between the discharge flow rate and the flow rate through the delivery side of the circuit.

SUMMARY OF THE INVENTION

Accordingly, it is an object of the present invention to provide a hydrostatic steering system, and load sensing controller therefor, which overcomes the problem of cavitation in a positive manner, without relying on the prior art approaches described above.

It is another object of the present invention to provide a load sensing controller which achieves the above-stated object, through the use of the controller's load sensing circuit.

The above and other objects are accomplished by the provision of an improved load sensing controller operable to control the flow of fluid from a source of pressurized fluid to a fluid pressure operated device of the type which may be subjected to overrunning loads. The source of fluid includes pressure responsive means for varying the delivery of fluid to the controller in response to variations in the demand for fluid. The controller comprises housing means including an inlet for connection to the source of fluid, a return port for connection to a reservoir, first and second control fluid ports for connection to the fluid pressure operated device, and a load signal port for connection to the pressure responsive means. Valve means is disposed in the housing means and defines a neutral position and an operating position. The housing means and the valve means cooperate to define a first fluid path communicating between the inlet port and the first control fluid port, and a second fluid path communicating between the second control fluid port and the return port when the valve means is in the operating position. The controller includes a fluid actuated means for imparting follow-up movement to the valve means proportional to the volume flow of fluid through the first fluid path, the first fluid path flowing through the fluid actuated means. The first fluid path includes a first variable flow control orifice having its minimum flow area when the valve means is in the neutral position, and an increasing flow area when the valve means is in the operating position. The second fluid path includes a second variable orifice having its minimum flow area when the valve means is in the neutral position and an increasing flow area when the valve means is in the operating position. Shuttle valve means is disposed within the housing means and has first and second shuttle inlets, and a shuttle outlet connected to the load signal port. A first load signal is communicated from the first fluid path, downstream of the first variable flow control orifice to the first shuttle inlet, and a second load signal is communicated from the second fluid path to the second shuttle inlet to insure that the pressure responsive means is responsive to whichever of the first and second fluid paths is at a higher pressure.

DESCRIPTION OF THE PREFERRED EMBODIMENTS

Figure 1:
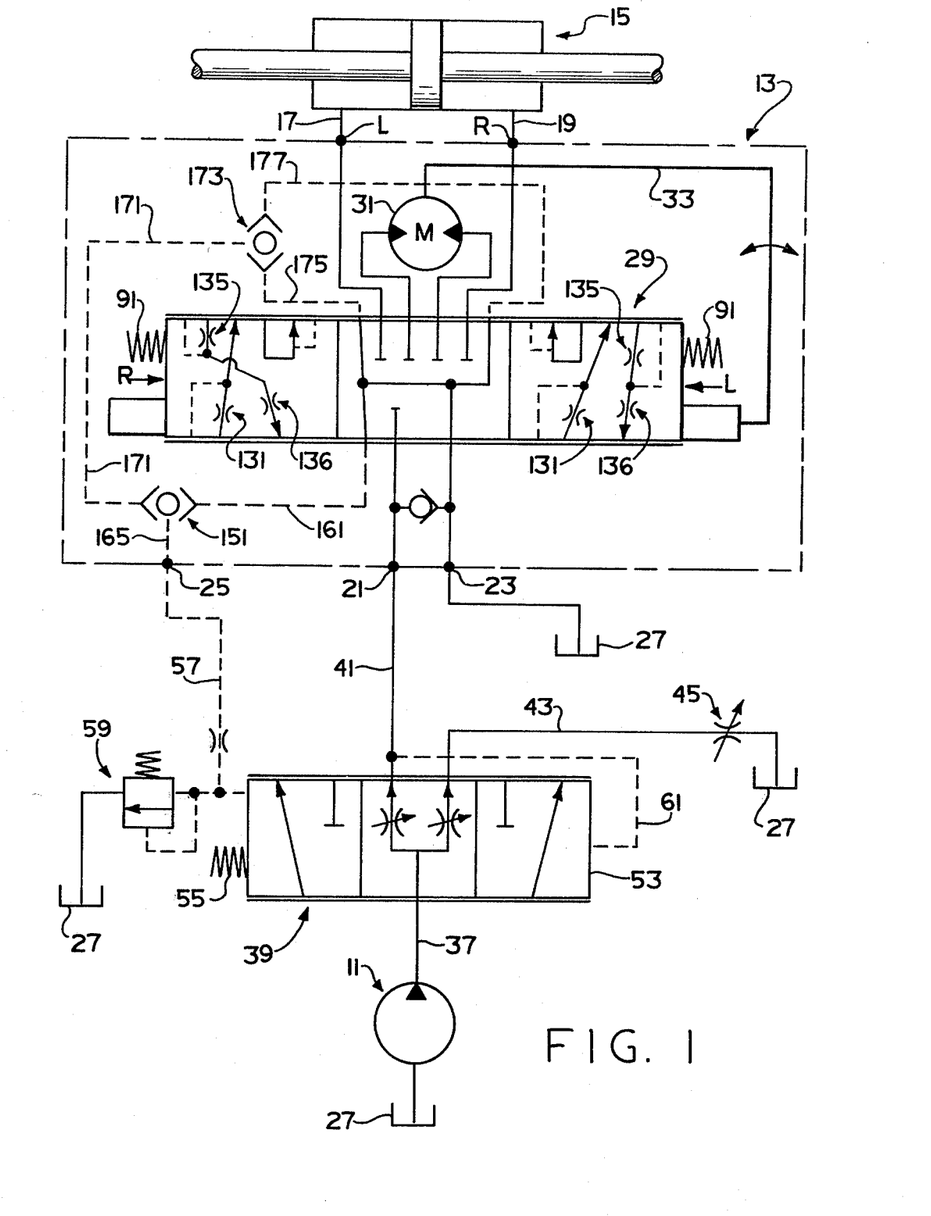
FIG. 1 is a hydraulic schematic of a load sensing priority flow control arrangement utilizing the present invention.

Referring now to the drawings, which are not intended to limit the present invention, FIG. 1 illustrates schematically a load sensing priority flow control system of the type in which the present invention may be utilized. The system includes a fixed displacement pump 11 which provides hydraulic fluid at a constant flow, and variable pressure, to a control valve mechanism, generally designated 13. The control valve mechanism 13 controls the flow and direction of pressurized fluid fed to a fluid pressure operated device, shown herein as a hydraulic cylinder 15. Although the fluid operated device connected to the valve mechanism 13 may be of many different types, it is an essential feature of the present invention that the fluid operated device be of the type which may be subjected to overrunning loads, i.e., an external force acting on the fluid operated device causes it to act as a pump, rather than as a motor.

In the subject embodiment, the control valve mechanism 13 is a steering control unit of the type illustrated in U.S. Pat. No. Re.25,126 (assigned to the assignee of the present invention). The steering control unit 13 includes a left fluid port L and a right fluid port R which are connected to the opposite ends of the cylinder 15 by a pair of fluid conduits 17 and 19 respectively. The steering control unit 13 further includes a fluid inlet port 21, a fluid return port 23, and a load signal port 25. The inlet of the fluid pump 11 and the fluid return port 23 are both connected to a fluid reservoir 27, shown schematically herein as separate reservoirs, for ease of illustration only.

Disposed within the steering control unit 13 is a valving arrangement, generally designated 29, which is movable from its neutral position shown in FIG. 1 to either a right turn position R, or a left turn position L. When the valving arrangement 29 is in either of the turn positions, the pressurized fluid passing through the valving 29 flows through a fluid meter 31, one function of which is to measure the proper amount of fluid to be fed to the appropriate fluid port L or R. As is well known in the art, the other function of the fluid meter 31 is to provide follow-up movement to the valving 29, such that the valving 29 is returned to its neutral position after the desired amount of fluid has been directed to the cylinder 15. In FIG. 1, this follow-up movement is achieved by means of a mechanical follow-up connection, indicated schematically at 33.

The output of the fixed displacement pump 11 is fed by means of a fluid conduit 37 to a pilot-operated flow control valve, generally designated 39. In its centered position, the flow control valve 39 provides a variably restricted flow, by means of a fluid conduit 41, to the inlet port 21 of the steering control unit 13, and also provides a variably restricted flow by means of a fluid conduit 43 to an auxiliary fluid circuit, represented schematically herein as a variable orifice 45.

The flow control valve 39 includes a valve member 53 which is biased by means of a spring 55 toward a position permitting substantially all of the fluid to pass from the fluid conduit 37 to the fluid conduit 41. A load signal is communicated from the load signal port 25 by means of a load signal line 57 to bias the valve member 53 in the same direction as does the spring 55. The load signal line 57 also communicates with a steering system pilot relief valve 59, as is well known in the art. The valve member 53 is biased by a load signal 61 toward a position permitting substantially all of the fluid in the conduit 37 to flow to the fluid conduit 43.

Although, in the preferred embodiment, the control valve mechanism 13 comprises a steering control unit, and the invention will be described in connection therewith, in should be clearly understood that the present invention is not limited to use with a steering control unit. The present invention may be utilized in connection with any type of load sensing flow control valve mechanism, wherein the fluid operated device controlled thereby is of the type which may be subjected to overrunning loads. However, it is an essential feature of the present invention that the control valve mechanism include some form of fluid actuated follow-up arrangement, in which the amount of follow-up movement is proportional to the flow of fluid through the control valve.

Steering Control Unit

Figure 2:
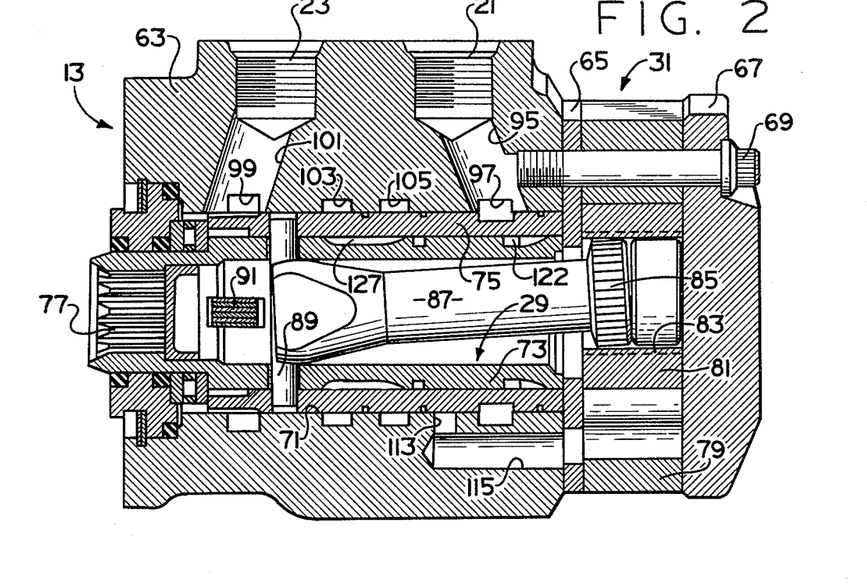
FIG. 2 is an axial cross section of a load sensing steering control unit of the type which may include the load sensing arrangement of the present invention.

The steering control unit 13, which will be described only briefly herein, may be seen in greater detail, and its operation better understood, by reference to U.S. Pat. Nos. Re.25,126 and 3,819,307, assigned to the assignee of the present invention. The steering control unit 13 is shown in FIG. 2 and is comprised of several sections, including a housing section 63, a port plate 65, a section comprising the fluid meter 31, and an end plate 67. These sections are held together in tight sealing engagement by means of a plurality of bolts 69 in threaded engagement with the housing 63. The housing section 63 defines the fluid inlet port 21, the fluid return port 23, and the left and right fluid ports L and R (not shown in FIG. 2).

Rotatably disposed within a valve bore 71 defined by the housing section 63 is the valving arrangement 29 shown schematically in FIG. 1. The valving 29 comprises a primary, rotatable valve member 73 (hereinafter referred to as the "spool"), and a cooperating, relatively rotatable follow-up valve member 75 (hereinafter referred to as the "sleeve"). At the forward end of the spool 73 is a portion having a reduced diameter, and defining a set of internal splines 77 which provide for a direct mechanical connection between the spool 73 and a steering wheel (not shown). The spool 73 and sleeve 75 will be described in greater detail subsequently.

The fluid meter section 31 may be of the type now well known in the art, and in the subject embodiment, includes an internally toothed stator 79, and an externally toothed rotor 81. The rotor 81 defines a set of internal splines 83, and in splined engagement therewith is a set of external splines 85, formed at the rearward end of a drive shaft 87. The drive shaft 87 has a bifurcated forward end permitting driving connection between the shaft 87 and the sleeve 75, by means of a pin 89 passing through a pair of circumferentially-elongated pin openings 90 in the spool 73. Thus, pressurized fluid flowing through the valving 29 in response to rotation of the spool 73 flows through the fluid meter 31, causing orbital and rotational movement of the rotor 81 within the stator 79. Such movement of the rotor 81 causes follow-up movement of the sleeve 75, by means of the drive shaft 87 and pin 89, to maintain a particular relative displacement between the spool 73 and sleeve 75, proportional to the rate of rotation of the steering wheel. A plurality of leaf springs 91, extending through spring openings 93 in the spool 73, urges the sleeve 75 toward the neutral position, relative to the spool 73.

Referring still to FIG. 2, it may be seen that pressurized fluid is communicated from the fluid inlet port 21 to the valving 29 by means of a fluid passage 95 which opens into an annular chamber 97, defined by the housing section 63. Return fluid flows from the valving 29 into an annular chamber 99 defined by the housing section 63, and from there flows to the fluid return port 23 by means of a fluid passage 101.

Figure 4:
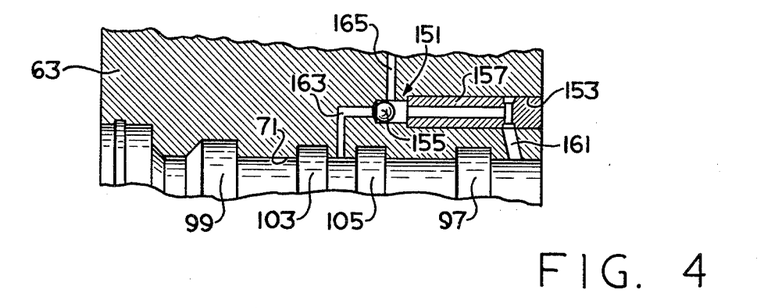
FIG. 4 is a fragmentary, axial cross section of the housing of the steering control unit shown in FIG. 2, but on a different plane.
Figure 5:
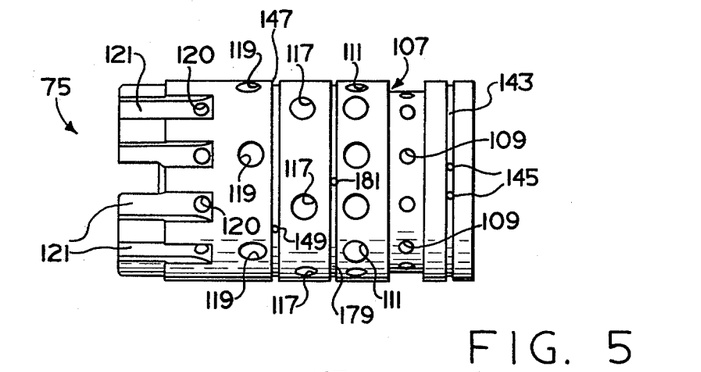
FIG. 5 is an elevation view of the follow-up valve member utilized in the steering control unit of FIG. 2.
Figure 6:
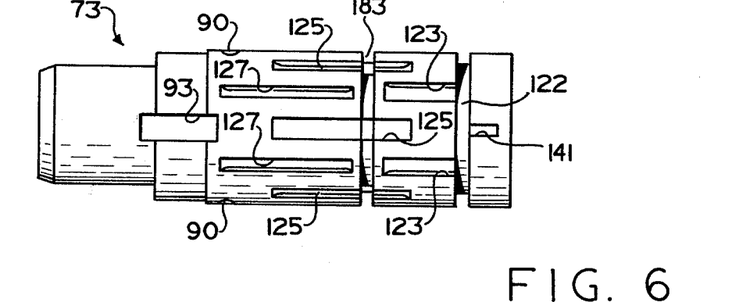
FIG. 6 is an elevation view of the primary valve member utilized in the steering control unit of FIG. 2.

Referring now to FIGS. 4, 5, and 6, the spool 73 and sleeve 75 will be described in greater detail. It should be noted that as shown in FIGS. 4, 5, and 6, the housing section 63 (shown on a plane different than that in FIG. 2), the sleeve 75, and spool 73 are in the proper relative axial position, i.e., the right end surface of each is in a common plane, as in the assembled position shown in FIG. 2. Referring now primarily to FIG. 4, the housing section 63 defines the annular chambers 97 and 99 described in connection with FIG. 2, and in addition, a pair of annular chambers 103 and 105, which are in fluid communication with the left fluid port L and right fluid port R, respectively.

Referring now primarily to FIG. 5, the sleeve 75 defines an annular groove 107 disposed axially to be in continuous fluid communication with the annular chamber 97. In fluid communication with the groove 107 is a plurality of radially-extending ports 109. The spool 73 and sleeve 75 comprise valving of the closed-center type because, when the spool and sleeve are in the neutral position, fluid flow through the ports 109 is blocked by the outer surface of the spool 73. Adjacent the annular groove 107 is a plurality of meter ports 111 which communicate fluid to and from the expanding and contracting volume chambers of the fluid meter 31 by means of a plurality of radial bores 113 (see FIG. 2) defined by the housing section 63, each of which communicates with an axial bore 115. The sleeve 75 also defines a plurality of fluid ports 117 which are in continuous fluid communication with the annular chamber 105, and thus, with the right fluid port R. The sleeve 75 further defines a plurality of fluid ports 119 which are in continuous fluid communication with the annular chamber 103, and thus, with the left fluid port L. Finally, the sleeve 75 defines a plurality of tank ports 120, each of which opens into an axially-oriented recess 121, which extends sufficiently to communicate with the annular chamber 99 and the fluid return port 23 as described previously.

Referring now primarily to FIG. 6, the spool 73 defines an annular groove 122, the function of which will be described subsequently. In fluid communication with the groove 122 is a plurality of axial slots 123, each of which extends a sufficient axial distance to communicate with one of the meter ports 111. As is well known to those skilled in the art, the direction of rotation of rotor 81 is determined by which of the meter ports 111 is connected to the axial slots 123, which is typically arranged such that the direction of rotor rotation is the same as the direction of spool rotation. The spool 73 also defines a plurality of axial slots 125, each of which extends a sufficient axial distance to communicate with one of the meter ports 111 and either a port 117 or a port 119. Finally, the spool 73 defines a plurality of axial slots 127, each of which extends a sufficient axial distance to communicate with either a port 117 or a port 119 and one of the tank ports 120. The flow of fluid through the valving 29 will be described in somewhat greater detail subsequently.

Although, in the preferred embodiment, the valving arrangement 29 comprises a spool and sleeve for which actuation is effected by relative rotation therebetween, it will be understood that within the scope of the invention, various other valving arrangements may be utilized. For example, rather than utilizing a spool and sleeve to define the various flow control orifices, the flow control orifices may be defined by the interaction of the housing bore and a valve sleeve (or spool), with the size of the orifices, and therefore the steering flow rate, varying with the rotation of the sleeve relative to the housing, or with the axial movement of the sleeve relative to the housing, or with a combination of relative axial and rotational movement. In addition, it is within the scope of the present invention for the various valving functions to be performed by valve members which are physically independent. For example, the direction and flow control valving function may be performed by a first set of valve members, while the commutating valve function may be performed by a second set of valve members, as is disclosed and illustrated in U.S. Pat. No. 3,584,985. Furthermore, because the subject embodiment of the invention utilizes valving members which are relatively rotatable, the fluid meter 31 is of the type which provides a rotatable follow-up movement. However, if the valving were actuated by relative axial movement, it is within the scope of the invention for the fluid-actuated follow-up mechanism to provide axial follow-up movement, for example, by means of a piston-cylinder arrangement.

Fluid Flow Path

Figure 3:
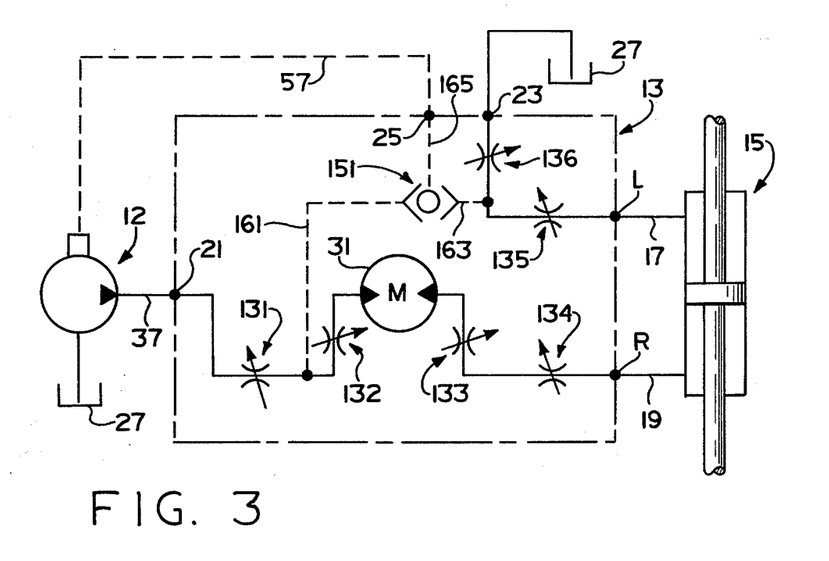
FIG. 3 is a uni-directional flow diagram illustrating the orifices of the steering control unit of FIG. 2.

The normal flow path of fluid through the steering control unit 13 will now be described in some detail, primarily by reference to FIG. 3, in conjunction with FIGS. 5 and 6. In FIG. 3, the steering control unit 13 is illustrated by means of a flow diagram (or orifice diagram), rather than by means of a hydraulic schematic of the type shown in FIG. 1. Also, in FIG. 3 the load signal line 57 is connected to the compensator section of a load sensing pump 12, rather than to the load signal chamber of the flow control valve 39, as shown in FIG. 1. Therefore, it will be understood that, as used hereinafter and in the appended claims, the terms "source of fluid" and "pressure responsive means" mean and include many different arrangements for providing pressurized fluid, and varying the delivery of fluid in response to the "demand", as indicated by variations in the pressure within the signal line 57.

In order to fully understand the operation of the present invention, it is essential to understand the function and sequence of operation of the variable flow control orifices defined at the interface of the spool 73 and sleeve 75. Therefore, in describing the flow of fluid through the various slots and ports defined by the spool and sleeve, during normal steering, there will be included a description of each of the flow control orifices shown in FIG. 3, and of the particular slots and ports which comprise that orifice. It should be noted that certain of the orifices in the flow diagram of FIG. 3 also appear in the hydraulic schematic of FIG. 1, whereas other of the orifices in FIG. 3 do not appear in FIG. 1. One of the reasons for this is that FIG. 1 is intended to be a schematic of a general load sensing flow control valve utilizing the present invention, whereas FIG. 3 is a flow diagram of the specific type of steering control unit 13 shown in FIG. 2. Therefore, only those orifices essential to the general concept of the present invention are illustrated in FIG. 1, whereas FIG. 3 includes all of the variable orifices present in the steering control unit 13.

In describing the fluid flow path through the steering control unit 13, it will be assumed that the steering wheel, and therefore the spool 73 have been rotated in the appropriate direction to achieve a right turn. Pressurized fluid entering the fluid inlet port 21 flows through the fluid passage 95, and through the annular chamber 97 and the annular groove 107. With the spool 73 displaced from the neutral position, relative to the sleeve 75, every other port 109 begins to communicate with the adjacent axial slot 123, to define therebetween a variable orifice, the composite of these individual orifices comprising a main, variable flow control orifice 131 (shown in FIG. 1), the size of which determines the rate of fluid flow through the valving 29. Therefore, pressurized fluid flows through every other port 109, and enters the axial slots 123. As may best be seen in FIG. 5, for each port 109 which communicates with one of the axial slots 123, there is a meter port 111 which also begins to communicate with the axial slot 123, and define a variable orifice therebetween. The composite of these individual variable orifices comprise a variable orifice 132 (not shown in FIG. 1). As is well known in the art, certain of the meter ports 111 which receive pressurized fluid from the axial slots 123 are in commutating fluid communication with the particular radial bores 13 which are instantaneously in communication with the expanding volume chambers of the fluid meter 31.

Each of the meter ports 111 which is not in fluid communication with an axial slot 123 is in fluid communication with the adjacent axial slot 125, to define a variable orifice therebetween, the composite of these individual orifices comprising a variable orifice 133 (not shown in FIG. 1). As is well known in the art, each of the meter ports 111 which is in communication with an axial slot 25 is in commutating fluid communication with the particular radial bores 13 which are instantaneously in fluid communication with the contracting volume chambers of the fluid meter 31. Therefore, the fluid flowing through variable orifice 132 may be referred to as "unmetered", whereas the fluid flowing through the variable orifice 133, downstream of the fluid meter 31, may be referred to as "metered" fluid.

With the valving 29 in a right turn condition, each of the axial slots 125 is also in fluid communication with the adjacent one of the ports 117, to define therebetween a variable orifice, the composite of these individual variable orifices comprising a variable orifice 134 (not shown in FIG. 1). Metered fluid which flows from the axial slots 125, through the variable orifice 134, and outward through the ports 117 enters the annular chamber 105, then flows to the right fluid port R, and to the cylinder 15 as described previously. Fluid being exhausted from the cylinder 15 returns to the left fluid port L of the steering control unit 13 and flows into the annular chamber 103, and into each of the ports 119. Each port 119 is in communication with the adjacent axial slot 127, to define therebetween a variable orifice, the composite of these individual variable orifices comprising a variable flow control orifice 135 (shown in FIG. 1). Each of the axial slots 127, receiving return fluid, is in communication with one of the tank ports 120, to define therebetween a variable orifice, the composite of these individual variable orifices comprising a variable flow control orifice 136 (shown in FIG. 1).

This return fluid flowing through the orifice 136 then flows out of the tank ports 120, through the recesses 121 and into the annular chamber 99, then flows to the fluid return port 23, and from there to the reservoir 27, thus completing the fluid path. It should be noted that, because the ports 119 are larger than the tank ports 120, and both are communicating with the parallel-sided slot 127, the variable orifice 135 will begin to open before the variable orifice 136, and, for relatively small valve deflections, will provide a larger orifice.

Load Sensing Circuit

Referring now primarily to FIGS. 4–6, the load sensing circuit of the steering control unit 13 will be described in detail. As may best be seen in FIG. 6, the spool 73 defines an axial load sensing slot 141 which is in fluid communication with the annular groove 122 and also, each of the axial slots 123. Therefore, the fluid pressure downstream of the variable flow control orifice 131 is present in the load sensing slot 141. As may be seen in FIG. 5, the sleeve 75 defines a load sensing groove 143, and in communication with the groove 143 is a pair of radially-oriented signal ports 145. As may be seen by viewing FIGS. 5 and 6 together, when the spool 73 and sleeve 75 are in the neutral position, the signal ports 145 are disposed on either side of the load sensing slot 141, but as the spool 73 is rotated from the neutral position, the slot 141 begins to communicate with one of the signal ports 145, depending upon the direction of rotation, such that the load signal pressure is present in the sensing groove 143. It is now well known in the art to drain the load signal circuit when the spool and sleeve are in neutral, and it is within the scope of the present invention to drain the load signal circuit near the load sensing slot 141, or at some other location in the circuit, none of which are shown herein, for simplicity.

Referring still primarily to FIGS. 5 and 6, the sleeve 75 defines a load sensing groove 147, and in communication with the groove 147 is a signal port 149. Again, by viewing FIGS. 5 and 6 together, it may be seen that with the spool 73 and sleeve 75 in the neutral position, the signal port 149 is disposed to maintain communication with the axial slot 127, for either direction of rotation. In the subject embodiment, the signal port 149 is positioned such that, for either direction of rotation of the spool 73, the port 149 will communicate with the flow path from whichever port (117 or 119) is cooperating to define the variable orifice 135. Therefore, the load signal pressure downstream of the variable orifice 135 is communicated through the signal port 149 and is present in the load sensing groove 147.

Referring now to FIG. 4, the housing section 63 includes a shuttle valve assembly, generally designated 151, the details and specific structure of which form no part of the present invention. The housing section 63 defines a stepped bore 153, and a shuttle ball 155 is disposed within the intermediate portion of the bore 153. The lefthand seat for the ball 155 is formed by the housing section 63, whereas the righthand seat is formed by a seat and orifice member 157 which is disposed within the largest portion of the bore 153. The housing section 63 defines a load sensing passage 161 which is in continuous fluid communication with the load sensing groove 143, and a load sensing passage 163 which is in continuous fluid communication with the load sensing groove 147. As is well known in the art, the shuttle valve assembly 151 is effective to communicate to a load sensing passage 165 whichever of the pressures in the passages 161 or 163 is higher. As may be seen in FIG. 3, the load signal passage 165 is in communication with the load signal port 25.

As an aid in understanding the operation of the present invention, there will first be a description of the manner in which the steering control unit 13 would operate without the present invention. Without the present invention, the pressure in the load signal passage 161 would be communicated directly to the load signal port 25 and therefore, the pressure responsive means for varying the delivery of fluid would be controlled in response to only the pressure in the load signal passage 161. Such an arrangement is acceptable under normal operating conditions. However, when the cylinder 15 is subjected to an overrunning load there is a momentary increase in the fluid pressure in the conduit 17 (return), and a momentary decrease in the fluid pressure in the conduit 19, and throughout the main flow path, from downstream of the variable orifice 131. This decrease in fluid pressure results in a lower load signal pressure in the load signal passage 161, indicating a demand for less fluid. Typically, when the cylinder 15 is subjected to an overrunning load, the drop in pressure in the main flow path is sufficient to cause the formation of cavitation "bubbles" or "gas pockets" within the main flow path. It has been found that such cavitation-induced gas pockets will normally either form within the meter section, or form elsewhere, and be transmitted to the meter section. When there is a gas pocket located in the meter section, subsequent rotation of the steering wheel and spool 73 may not necessarily result in the desired displacement of the steering cylinder 15, because the gas pocket must first be displaced by pressurized fluid before normal steering operation can occur. However, the presence of the gas pocket in the meter section can reduce the resistance to turning of the meter such that rotation of the steering wheel will cause the spool 73 and sleeve 75 to rotate freely, while possibly remaining in the neutral position, relative to each other, and thus preventing any flow of fluid through the valving, and into the meter to eliminate the gas pocket. The condition described would seem to the operator as a complete loss of steering. In order to prevent this condition from occurring, it has been necessary to utilize some type of correction, which is normally undesirable. For example, the cavitation condition described can be minimized by substantially restricting the return fluid flow path. However, this results in a substantial pressure drop in the return flow path, which serves no useful purpose during normal operation, but imposes a full time increase in horsepower consumed by the system.

The operation of the steering control unit 13, with the present invention included, will now be described. During normal steering operations, the shuttle ball 155 is in the lefthand position illustrated in FIG. 4 because, the load signal pressure downstream of the variable orifice 131 is higher than the load signal pressure downstream of the variable orifice 135. As is well known in the art, in a series arrangement of orifices in a fluid circuit, the fluid pressure progressively decreases, downsteam of each successive orifice. When the steering cylinder 15 is now subjected to an overrunning load, there again is an instantaneous increase in the fluid pressure in the return fluid path, and an instantaneous decrease in the pressure in the main flow path. As this occurs, the fluid pressure downstream of the variable orifice 135 increases, restricted by the orifice 136, while the fluid pressure downstream of the main flow control orifice 131 decreases. Very quickly, the pressure in the load signal passage 163 becomes higher than the pressure in the load signal passage 161, causing the shuttle ball 155 to move to the right in FIG. 4, thus communicating the pressure in the load signal passage 163 to the load signal port 25, by means of the load signal passage 165. As mentioned previously, without the present invention, the overrunning condition results in a decrease in the load signal, causing a decrease in the supply of pressurized fluid to the main flow path (orifices 131–134), further increasing the opportunity for cavitation to occur.

By utilizing the present invention to sense the higher load signal pressure downstream of the variable orifice 135, and communicate the higher load signal to the source of pressurized fluid, the fluid source is given an indication of a demand for a greater amount of fluid. Based upon the higher pressure at the load signal port 25, the source provides sufficient fluid to the fluid inlet port 21 to keep the main flow path full and prevent cavitation.

In addition to keeping the main flow path full, the higher load signal and increased fluid delivery to the unit 13 acts to regulate the conditions causing the potential cavitation. Because the present invention relates to a control valve mechanism of the type having a fluid actuated follow-up mechanism, the increased rate of fluid flow through the main flow path, and through the fluid meter 31, causes the fluid meter 31 to provide a follow-up movement to the sleeve 75, by way of the shaft 87 and pin 89, which exceeds the rate of rotation imparted to the spool 73 by the steering wheel. Therefore, rather than the spool and sleeve maintaining a fixed relative displacement, as determined by the rate of rotation of the steering wheel, the relative displacement between the spool and sleeve actually decreases slightly, thus decreasing the variable orifices 135 and 136, and increasing the restriction in the return fluid path, to restrain the overrunning of the cylinder 15. In summary, the present invention prevents cavitation by providing an increased load signal in response to an overrunning load, thereby increasing the rate of flow through the main flow path to keep the main flow path full, and increasing the rate of flow through the fluid actuated follow-up mechanism, to decrease valve displacement and restrict flow through the return fluid path.

In the subject embodiment, it is preferred that the variable orifices 134 and 135 begin to open at substantially the same time as the valving is displaced from the neutral position, and that the variable orifice 136 begin to open slightly later than the orifices 134 and 135, to permit the buildup of a small amount of pressure downstream of the orifice 135.

Although the shuttle valve assembly 151 has been illustrated very simply in FIG. 4, it should be understood that it is contemplated herein, and is within the scope of the present invention, to modify the shuttle valve assembly in various ways. For example, it may be desirable to apply a pressure bias to the shuttle ball 155 in one direction (probably toward a position opposite that shown in FIG. 4), such that a predetermined minimum pressure differential is required to move the shuttle ball 155 to the opposite position. As another example, various techniques may be applied, which are generally well known in the art, to prevent the shuttle ball 155 from "hunting", i.e., moving from one position to the other rapidly, in response to a very small pressure differential between the passages 161 and 163.

Referring again to FIG. 1, as was mentioned previously, one purpose of FIG. 1 is to illustrate schematically the application of the present invention to a general three position, four way flow control valve having a fluid actuated follow-up. FIG. 1 includes the shuttle valve assembly 151 having its output connected to the load signal port 25 by means of the load signal passage 165, and having one of its inputs connected to the main (delivery) flow path, downstream of the main variable flow control orifice 131, by means of the load signal passage 161. However, the other input to the shuttle valve assembly 151 is not connected directly to a load signal pick-up point, such as the load sensing groove 147 of FIG. 5. Instead, the other input to the shuttle valve assembly 151 is by means of a load signal passage 171 which is connected to the output of a shuttle valve assembly 173. One of the inputs to the shuttle valve assembly 173 is a load signal passage 175 which, assuming a right turn condition in FIG. 1, is connected to the return flow path downstream of the variable orifice 135, in the same manner as the load signal passage 163 of FIG. 4.

The other input to the shuttle valve assembly 173 is a load signal passage 177, which is not shown in FIG. 4. The load signal passage 177 is connected to the delivery flow path in FIG. 1 at a location between the output of the fluid meter 31 and the right fluid port R. If the additional load sensing pick-up point represented by the load signal passage 177 were to be applied to the steering control unit 13, as illustrated in FIG. 3, the passage 177 would be connected to the delivery flow path downstream of the variable orifice 133, which has already been known to those skilled in the art. One advantage of sensing the delivery flow path load pressure downstream of the orifice 133 is that in the event fluid pressure is generated only by manual input to the fluid meter 31, the pressure at the sensing location downstream of the orifice 133 would be greater than that downstream of the orifice 131, and this higher generated pressure would be transmitted by the load signal passage 177, and then to the load signal port 25.

Referring again to FIGS. 5 and 6, if the additional shuttle valve assembly 173 were to be utilized, the additional load signal passage 177 would be located in such a position to be in continuous fluid communication with a load sensing groove 179 defined by the sleeve 75. In fluid communication with the load sensing groove 179 is a signal port 181 which, in turn, is in fluid communication with an annular distribution groove 183 defined by the spool 73. Because the groove 183 is in fluid communication with each of the axial slots 125, fluid pressure downstream of the variable orifice 133 is present in the groove 183, the signal port 181, and the groove 179.

Figure 7:
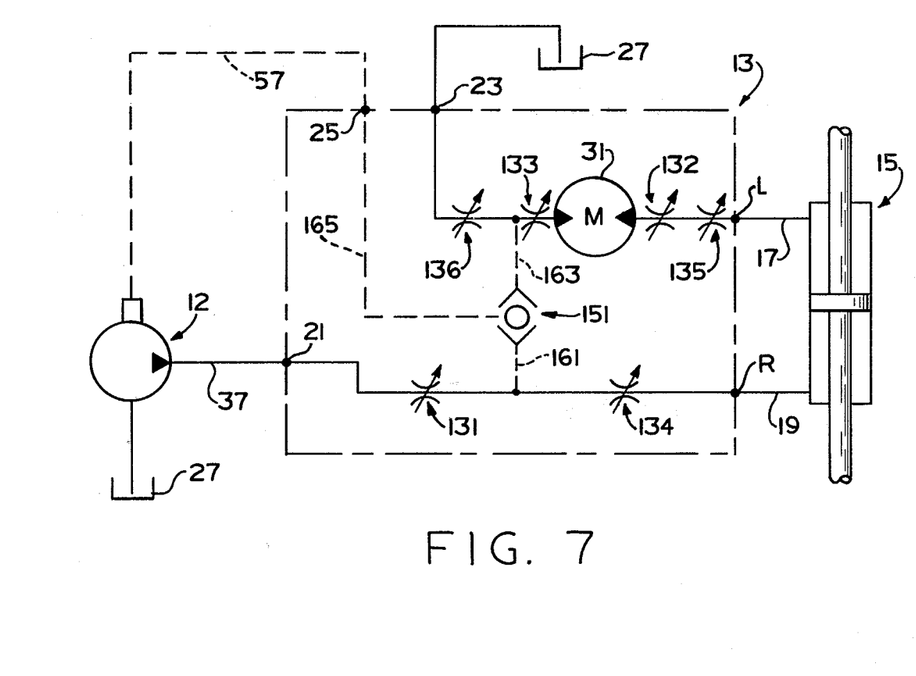
FIG. 7 is a flow diagram, similar to FIG. 3, illustrating an alternative embodiment of the invention.

Referring now to FIG. 7, there is illustrated an alternative embodiment of the present invention in which like elements bear like numerals. It should be noted that in the embodiment of FIG. 7, the flow path has been somewhat rearranged, such that no new elements are added in FIG. 7. In the alternative embodiment, the primary difference is that the fluid meter 31 is located downstream of the steering cylinder 15, rather than upstream as in FIG. 3. Thus, in the alternative embodiment the fluid meter 31 is in the return fluid path, rather than in the delivery fluid path. In the system of FIG. 7, the present invention overcomes the problem of cavitation in the fluid meter, in the same manner as in the system of FIG. 3. However, in the system of FIG. 7, cavitation of the fluid meter is not caused by application of an overrunning load to the steering cylinder 15, but instead, is caused by a sudden hard steering input which results in fluid being discharged from the fluid meter at a rate faster than fluid is able to flow through the delivery side of the system, and be discharged from the steering cylinder 15, to fill the inlet side of the fluid meter. In either embodiment, the application of an external force at some point in the system results in increased fluid pressure downstream of the point of force, and a decrease in fluid pressure upstream of the point of force such that cavitation results. Therefore, it should be understood that reference in the appended claims to an "external force" means and includes both an overrunning load on the steering cylinder, and a steering input applied, indirectly, to the fluid meter.

It should be understood that various alterations and modifications of the present invention will occur to others upon a reading and understanding of the present specification. For example, it should be apparent that the use of the present invention permits the sensing of load pressure signals at any desired number of locations within a control valve mechanism of the type to which the present invention relates, and the number of shuttle valve assemblies required to provide the highest load signal pressure will be one less than the number of load sensing locations. Therefore, it is intended that all such alterations and modifications are within the scope of the present invention, insofar as they fall within the scope of the appended claims.

What is claimed is:

1. A controller operable to control the flow of fluid from a source of pressurized fluid to a fluid pressure operated device of the type which may be subjected to overrunning loads, the source of fluid including pressure responsive means for varying the delivery of fluid to said controller in response to the variations in demand for fluid by said controller, said controller comprising:
    (a) housing means including an inlet port for connection to the source of fluid, a return port for connection to a reservoir, first and second control fluid ports for connection to the fluid pressure operated device, and a load signal port for connection to the pressure responsive means;
    (b) valve means disposed in said housing means and defining a neutral position and an operating position;
    (c) said housing means and said valve means cooperating to define a first fluid path communicating between said inlet port and said first control fluid port and a second fluid path communicating between said second control fluid port and said return port when said valve means is in said operating position;
    (d) fluid-actuated means for imparting follow-up movement to said valve means proportional to the volume flow of fluid through said first fluid path, said first fluid path flowing through said fluid-actuated means;
    (e) said first fluid path including a first variable flow control orifice having its minimum flow area when said valve means is in said neutral position and an increasing flow area when said valve means is in said operating position;
    (f) said second fluid path including a second variable orifice having its minimum flow area when said valve means is in said neutral position and an increasing flow area when said valve means is in said operating position;

(g) shuttle valve means disposed within said housing means and having first and second shuttle inlets and a shuttle outlet connected to said load signal port;

(h) means operable to communicate a first load signal from said first fluid path, downstream of said first variable flow control orifice, to said first shuttle inlet; and (i) means operable to communicate a second load signal from said second fluid path to said second shuttle inlet to insure that the pressure responsive means is responsive to whichever of said first and second fluid paths is at a higher load pressure.

2. A controller operable to control the flow of fluid from a source of pressurized fluid to a fluid pressure operated device of the type which may be subjected to overrunning loads, the source of fluid including pressure responsive means for varying the delivery of fluid to said controller in response to variations in the demand for fluid by said controller, said controller comprising:

(a) housing means including an inlet port for connection to the source of fluid, a return port for connection to a reservoir, first and second control fluid ports for connection to the fluid pressure operated device, and a load signal port for connection to the pressure responsive means;

(b) valve means disposed in said housing means and defining a neutral position;

(c) said housing means and said valve means cooperating to define a first fluid path communicating between said inlet port and said first control fluid port and between said second control fluid port and said return port when said valve means is displaced from said neutral position in a first direction, and to define a second fluid path communicating between said inlet port and said second control fluid port and between said first control fluid port and said return port when said valve means is displaced from said neutral position in a second direction;

(d) fluid actuated means for imparting follow-up movement to said valve means proportional to the volume flow of fluid through whichever of said first and second fluid paths is selected by said displacement of said valve means, said fluid path including said fluid actuated means;

(e) said first and second fluid paths including first and second variable flow control orifices, respectively, each of said orifices having its minimum flow area when said valve means is disposed adjacent said neutral position, and an increasing flow area when said valve means is displaced increasingly from said neutral position;

(f) each of said first and second fluid paths having a return variable flow control orifice having its minimum flow area when said valve means is adjacent its neutral position, and an increasing flow area when said valve means is displaced from said neutral position;

(g) shuttle valve means disposed within said housing means and having first and second shuttle inlets, and a shuttle outlet connected to said load signal port;

(h) means operable to communicate a first load signal from said first fluid path, downstream of said first variable flow control orifice, to said first shuttle inlet when said valve means is displaced in said first direction, and to communicate a second load signal from said second fluid path, downstream of said second variable flow control orifice, to said first shuttle inlet, when said valve means is displaced in said second direction; and (i) means operable to communicate a return load signal from whichever of said first and second fluid paths is selected by displacement of said valve means, said return load signal being communicated to said second shuttle inlet to insure that the pressure responsive means is responsive to said return load signal whenever said return load signal represents a higher load pressure than whichever of said first and second load signals is communicated to said first shuttle inlet.

3. A controller as claimed in claim 1 or 2 wherein said valve means comprises a primary, rotatable valve member and a cooperating, relatively rotatable follow-up valve member, said primary valve member and said follow-up valve member defining said neutral position relative to each other.

4. A controller as claimed in claim 3 wherein said variable flow control orifice is defined at the interface of said primary and follow-up valve members and the flow area of said orifice is varied by relative rotation of said primary and follow-up valve member.

5. A controller as claimed in claim 3 wherein said fluid actuated means comprises an internally toothed member and an externally toothed member eccentrically disposed within said internally toothed member for relative orbital and rotational movement therebetween.

6. A controller as claimed in claim 5 wherein said fluid actuated means includes means for transmitting the rotational movement of one of said internally toothed member and said externally toothed member to said follow-up valve member.

7. A controller as claimed in claim 1 wherein said first fluid path includes a third variable orifice disposed downstream of said fluid actuated means, said third orifice having its minimum flow area when said valve means is in said neutral position, and an increasing flow area when said valve means is in said operating position.

8. A controller as claimed in claim 7 including means operable to communicate a third load signal from said first fluid path, downstream of said third variable orifice to a third shuttle inlet of said shuttle valve means.

9. A controller as claimed in claim 8 wherein said shuttle valve means includes:

(a) a first shuttle valve having said first shuttle inlet and a fourth shuttle inlet, said outlet of said first shuttle valve being connected to said load signal port; and (b) a second shuttle valve having said second and third shuttle inlets, and a shuttle outlet connected to said fourth shuttle inlet of said first shuttle valve.

10. A controller as claimed in claim 1 wherein said second fluid path includes a fourth variable orifice disposed downstream of said second variable orifice and having its minimum flow area when said valve means is in said neutral position, and an increasing flow area when said valve means is in said operating position.

11. A controller as claimed in claim 10 wherein said second variable orifice begins to open before said fourth variable orifice begins to open as said valve means is displaced from said neutral position toward said operating position, to permit a build-up of fluid pressure downstream of said second variable orifice.

12. A controller operable to control the flow of fluid from a source of pressurized fluid to a fluid pressure operated device, the source of fluid including pressure responsive means for varying the delivery of fluid to said controller in response to the variations in demand for fluid by said controller, said controller comprising:
   (a) housing means including an inlet port for connection to the source of fluid, a return port for connection to a reservoir, first and second control fluid ports for connection to the fluid pressure operated device, and a load signal port for connection to the pressure responsive means;
   (b) valve means disposed in said housing means and defining a neutral position and an operating position;
   (c) said housing means and said valve means cooperating to define a first fluid path communicating between said inlet port and said first control fluid port and a second fluid path communicating between said second control fluid port and said return port when said valve means is in said operating position;
   (d) fluid-actuated means for imparting follow-up movement to said valve means proportional to the volume flow of fluid through said second fluid path, said fluid-actuated means being of the type which may be subjected to an external force, said second fluid path flowing through said fluid-actuated means;
   (e) said first fluid path including a first variable flow control orifice having its minimum flow area when said valve means is in said neutral position and an increasing flow area when said valve means is in said operating position;
   (f) said second fluid path including a second variable orifice having its minimum flow area when said valve means is in said neutral position and an increasing flow area when said valve means is in said operating position;
   (g) shuttle valve means disposed within said housing means and having first and second shuttle inlets and a shuttle outlet connected to said load signal port;
   (h) means operable to communicate a first load signal from said first fluid path, downstream of said first variable flow control orifice, to said first shuttle inlet; and
   (i) means operable to communicate a second load signal from said second fluid path, downstream of said fluid-actuated follow-up means, to said second shuttle inlet to insure that the pressure responsive means is responsive to whichever of said first and second fluid paths is at a higher load pressure.

13. A controller operable to control the flow of fluid from a source of pressurized fluid to a fluid pressure operated device, the source of fluid including pressure responsive means for varying the delivery of fluid to said controller in response to variations in the demand for fluid by said controller, said controller comprising:
   (a) housing means including an inlet port for connection to the source of fluid, a return port for connection to a reservoir, first and second control fluid ports for connection to the fluid pressure operated device, and a load signal port for connection to the pressure responsive means;
   (b) valve means disposed in said housing means and defining a neutral position;
   (c) said housing means and said valve means cooperating to define a first fluid path communicating between said inlet port and said first control fluid port and between said second control fluid port and said return port when said valve means is displaced from said neutral position in a first direction, and to define a second fluid path communicating between said inlet port and said second control fluid port and between said first control fluid port and said return port when said valve means is displaced from said neutral position in a second direction;
   (d) fluid actuated means for imparting follow-up movement to said valve means proportional to the volume flow of fluid through whichever of said first and second fluid paths is selected by said displacement of said valve means, said fluid-actuated means being disposed between the fluid pressure operated device and said return port and being of the type which may be subjected to an external force, said fluid path including said fluid actuated means;
   (e) said first and second fluid paths including first and second variable flow control orifices, respectively, each of said orifices having its minimum flow area when said valve means is disposed adjacent said neutral position, and an increasing flow area when said valve means is displaced increasingly from said neutral position;
   (f) each of said first and second fluid paths having a return variable flow control orifice having its minimum flow area when said valve means is adjacent its neutral position, and an increasing flow area when said valve means is displaced from said neutral position;
   (g) shuttle valve means disposed within said housing means and having first and second shuttle inlets, and a shuttle outlet connected to said load signal port;
   (h) means operable to communicate a first load signal from said first fluid path, downstream of said first variable flow control orifice, to said first shuttle inlet when said valve means is displaced in said first direction, and to communicate a second load signal from said second fluid path, downstream of said second variable flow control orifice, to said first shuttle inlet, when said valve means is displaced in said second direction; and
   (i) means operable to communicate a return load signal from whichever of said first and second fluid paths is selected by displacement of said valve means, said return load signal being communicated from downstream of said fluid-actuated follow-up means to said second shuttle inlet to insure that the pressure responsive means is responsive to said return load signal whenever said return load signal represents a higher load pressure than whichever of said first and second load signals is communicated to said first shuttle inlet.

* * * * *